United States Patent Office 3,809,699
Patented May 7, 1974

3,809,699
PROCESS FOR PRODUCING 6-AMINO-
PENICILLANIC ACID
Toshiyasu Ishimaru, Suita, Japan, assignor to President of
Osaka University, Osaka, Japan
No Drawing. Filed Dec. 16, 1970, Ser. No. 98,907
Claims priority, application Japan, Dec. 26, 1969,
44/1,002; Feb. 2, 1970, 45/9,139; Feb. 13, 1970,
45/12,378
Int. Cl. C07d 91/14, 99/16
U.S. Cl. 260—306.7                    15 Claims

ABSTRACT OF THE DISCLOSURE 6-aminopenicillanic acid is prepared, with advantage in industrial viewpoint, by (A) reacting 6-acylaminopenicillanic acid or a salt thereof with a halogenated compound such as trihalide of phosphorus, tetrahalide of silicon, phosphorous pentahalide, phosgene or thiophosgene, in the presence of an acid-binding reagent for the purpose of to protect the carboxyl group of the 6-acylamidopenicillanic acid by forming a mixed acid anhydride, (B) converting the resultant mixed acid anhydride into the corresponding imino halide by reacting it with an imino halide-forming reagent such as phosphorus oxychloride, phosphorus pentachloride, phosphorous tribromide, phosgene, oxalyl chloride or protocatechyl phosphorous trichloride to form the corresponding imino halide, (C) converting the resultant imino halide into the corresponding imino-ether by reacting it with an alcohol and finally (D) hydrolyzing the imino ether and removing the protected group of the carboxyl group to form 6-aminopenicillanic acid.

---

The present invention relates to a process for producing 6-aminopenicillanic acid of the Formula II,

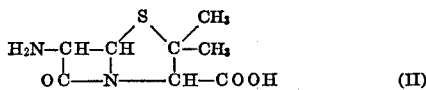
(II)

from a 6-acylamidopenicillanic acid of the General Formula I,

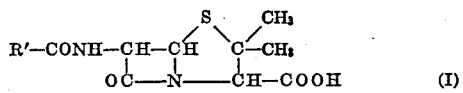
(I)

wherein R' signifies a hydrogen atom or a substituted or unsubstituted alkyl, aryl, alkenyl, aralkyl, or aryloxy group, by a chemical process. In particular, R' is halogen or a residual group of an organic carboxylic acid having 1 to 17 carbon atoms. 6-aminopenicillanic acid (II) (hereinafter referred to as 6-APA) per se does not show any significant biological activities such as anti-biotic properties, but is an important compound as the starting material for producing semi-synthetic penicillins.

An object of this invention is to provide a novel chemimal process without using enzymatic process for producing 6-APA (II), containing no harmful proteins from 6-acylamidopenicillanic acids (I).

Quite few reports have, heretofore been published concerning chemical processes for producing 6-APA (II) from 6-acylamidopenicillanic acids (I). Among the reports, Chem. Abstr. 69, 19145, (1968) and U.S. Pat. No. 3,499,909 disclose a process which is characterized by protecting the carboxyl group by converting into an alkylsilyl ester. This process is considered relatively advantageous, but is not satisfactory from an industrial viewpoint.

It is known that there is a process for preparing a N-monosubstituted imino chloride by reacting a N-substituted acid amide with phosphorus pentachloride [Chemisch Berichte, 28, 2367 (1895); ibid., 93, 1231 (1960)].

Also, in preparing a 7-aminocephalosporanic acid ester [Chem. Abstr. 65, 10596, (1966), Japanese patent publication No. 13,862/66], 7-aminocephalosporanic acid [Chem. Abstr., 71, 61403, (1969), ibid, 71, 112959 (1969)] and a 6-aminopenicillanic acid ester [J. Med. Chemistry, 13, 607 (1970)], there has already been utilized a process which is characterized by reacting an N-monosubstituted imino chloride with an alcohol to form an imino ether, and then splitting the imino other group-ing by hydrolysis.

As a result of a number of researches on the protection of the carboxyl group at 3-position of penicillins, the present inventors have found out a method for protecting the carboxyl group by conversion into a mixed acid anhydride. Based on this finding, the present invention has been accomplished.

That is, the present invention relates to a process for producing 6-APA which is characterized by reacting a compound of the General Formula I or a salt thereof with a halogenated compound of the general formula, $$R^2\text{—}X \qquad (III)$$

(wherein $R^2$ signifies a residue of the protecting group and X signifies a halogen atom) in the presence of an acid-binding agent, converting the reaction product into a corresponding imino halide by reacting with an imino halide-forming reagent, reacting said imino halide with a hydroxyl compound of the general formula, $$R^3\text{—}OH \qquad (IV)$$

(wherein $R^3$ signifies a substituted or unsubstituted alkyl, aryl, aralkyl, or cycloalkyl group), and then hydrolyzing the reaction product.

According to this invention, while any 6-acylamidopenicillanic acid (I) may be used as the starting material, suitable from the practical viewpoint are salts of penicillins obtained by the biological processes. Examples of such penicillins include those in which the acyl group is derived from, for example, aliphatic carboxylic acids such as acetic, propionic, $\Delta^2$-pentenylcarboxylic, and n-heptylcarboxylic acids; aralkyl carboxylic acids such as p-hydroxyphenylacetic and phenylacetic acids; and aryloxyacetic acids. These penicillins are ordinarily used as a tertiary amine salt, alkali metal salt, alkaline earth metal salt, etc.

The compounds of the formula $R^2$—X (III) used in this invention for introducing the protecting group include the following groups: compounds of the general formula,

(III-1)

wherein each of R' and R", which may be the same or different, signifies a substituted or unsubstituted alkyl, aryl, aralkyl, alkyloxy, alkylthio, aryloxy, or aralkyloxy group or a halogen atom, and R' and R" may jointly form a ring, M signifies a phosphorus atom, and X signifies a halogen atom; compounds of the general formula,

(III-2)

wherein each of R', R" and R''', which may be the same or different, signifies a substituted or unsubstituted alkyl, aryl, aralkyl, alkyloxy, alkylthio, aryloxy, or aralkyloxy group having 1 to 7 carbon atoms or a halogen atom, and R' and R" may jointly form a ring, or R' or R" and R''' may jointly form =O or =S and M signifies a silicon atom, all of R', R" and R''' being halogen atoms, or a least one of R', R and R''' forming a ≡C—O—Si≡ linkage; compounds of the general formula,

(III-3)

wherein R' signifies a halogen atom or a substituted or unsubstituted alkyl, alkoxy, alkylthio, aryl, aralkyl, aryloxy, or aralkyloxy group, or phenyl or phenoxy group, each of R'', R''' and R'''' signifies a halogen atom, and R'' and R''' may jointly form a ring or =O or =S, M signifies a phosphorus atom, and X signifies a halogen atom; and phosgene,

(III-4)

wherein R' signifies a substituted or unsubstituted alkyl, alkyloxy, aryl, aralkyl, aryloxy, or aralkyloxy group, or phenyl or phenoxy group, M signifies a sulfur atom, O signifies an oxygen atom, and X signifies a halogen atom. Typical examples of these compounds are given below.

Examples of the compounds of the Formula III-1 include $PCl_3$, $PBr_3$, $C_6H_5PCl_2$, $C_6H_5PBr_2$, $C_4H_9PCl_2$,

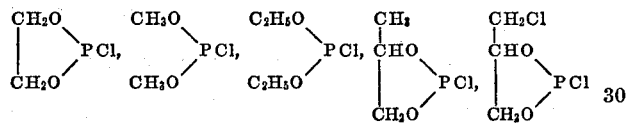

$CH_3OPCl_2$, $C_2H_5OPCl_2$, $C_3H_7OPCl_2$, $C_4H_9OPCl_2$, $C_6H_5OPCl_2$, $ClCH_2CH_2OPCl_2$, $C_6H_5CH_2OPCl_2$, $ClCH_2CH(Cl)CH_2OPCl_2$, $CH_3CH(Cl)CH_2OPCl_2$, $CH_3OCH_2CH_2OPCl_2$, $C_2H_5SPCl_2$

Examples of the compounds of the Formula III-2 include silicon compounds such as $SiCl_4$, $CH_3OSiCl_3$, $C_2H_5OSiCl_3$, $C_4H_9OSiCl_3$, $CH_3OCH_2CH_2OSiCl_3$, $ClCH_2CH_2OSiCl_3$, $(CH_3O)_2SiCl_2$, $(C_2H_5O)_2SiCl_2$, $(CH_3OCH_2CH_2O)_2SiCl_2$, $(C_3H_7O)_2SiCl_2$, $(C_4H_9O)_2SiCl_2$,

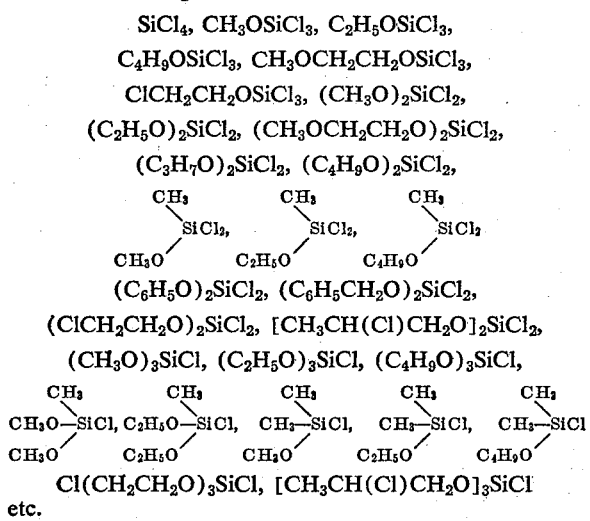

$(C_6H_5O)_2SiCl_2$, $(C_6H_5CH_2O)_2SiCl_2$, $(ClCH_2CH_2O)_2SiCl_2$, $[CH_3CH(Cl)CH_2O]_2SiCl_2$, $(CH_3O)_3SiCl$, $(C_2H_5O)_3SiCl$, $(C_4H_9O)_3SiCl$, $Cl(CH_2CH_2O)_3SiCl$, $[CH_3CH(Cl)CH_2O]_3SiCl$ etc.

Examples of the compounds of the Formula III-3 include phosphorus compounds such as $PCl_5$, $POCl_3$,

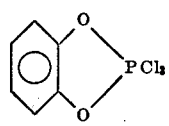

$C_6H_5POCl_2$, $CH_3OPOCl_2$, $C_2H_5OPOCl_2$, $C_3H_7OPOCl_2$, $C_4H_9OPOCl_2$, $ClCH_2CH_2OPOCl_2$, $CH_3OCH_2CH_2OPOCl_2$, $C_6H_5OPOCl_2$, $C_2H_5SPOCl_2$, etc.

Among the compounds of the Formula III used in this invention, $PCl_3$, $POCl_3$, $PCl_5$, $COCl_2$, etc., had been known as a halogenating agent but not as a protecting group until the present inventors have made it clear for the first time that these compounds have excellent properties as a protecting group for carboxylic acids.

When a compound of the Formula III contains two or more halogen atoms in its molecule, it is not clear whether all of the halogen atoms are included in the formation of a mixed acid anhydride or not. For example, in the case of phosphorus trichloride, when 0.6 to 0.9 mol of this compound was used for one mol of the compound of Formula I, an extremely high yield may be obtained. From this fact it may be assumed that the reaction proceeds according to the following scheme:

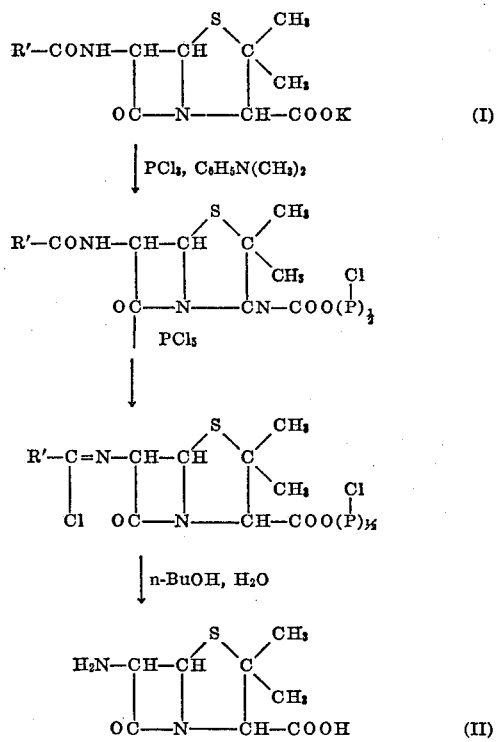

In carrying out the present process, a compound of the Formula I or a salt thereof is dissolved or suspended in an inert solvent such as, for example, methylene chloride, chloroform, ethylene chloride, trichloroethylene, tetrahydrofuran, dioxane, diglyme, ethyl acetate, nitromethane, or the like, and an acid-binding agent is added thereto. As the acid-binding agent may be used trialkylamines, N-alkylmorpholines, N-alkylpiperidines, pyridine and its homologs, quinoline and its homologs, N,N-dialkylarylamines, etc. Among these compounds, N,N-dialkylanilines and 2,6-lutidine are especially preferred. Then, to the mixture at room temperature or at a temperature below 0° C. is added a compound of the Formula III in excess of the amount calculated from the number of halogen atoms, to form a mixed acid anhydride. It may sometimes be necessary to heat the mixture at a temperature above room temperature, depending upon the reactants used. To the resulting solution of mixed acid anhydride is added at room temperature or at a temperature below 0° C. an imino halide-forming reagent in excess of the equivalent mols. As the imino halide-forming reagent, may be mentioned, for example, phosphorus oxychloride ($POCl_3$), phosphorus pentachloride ($PCl_5$), phosphorus tribromide ($PBr_3$), phosgene ($COCl_2$), oxalyl chloride (COCl·COCl), protocatechylphosphorus trichloride

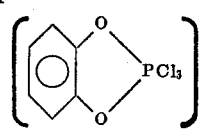

etc. Among these compounds phosphorus pentachloride and phosgene are particularly preferred. The optimum conditions of this reaction are variable according to the kind of reagents, solvents and acid-binding agents. For example, when methylene chloride, N,N-dimethylaniline and phosphorus pentachloride are used, the reaction is complete in 2 to 3 hours at a temperature of −50° to −20° C.

The resulting imino halide is reacted with a hydroxyl Compound IV at a temperature below 0° C. As the compound of Formula IV there are used methanol, ethanol, propanol, butanol, amyl alcohol, 2-ethylhexyl alcohol, benzyl alcohol, 2-phenethyl alcohol, cyclohexanol, etc. Among these alcohols, especially preferred are methanol, n-propanol, n-butanol, isoamyl alcohol, etc. The compound of the Formula IV is used in an amount of 3 to 20 mols per mol of the compound of Formula I, preferably together with a small amount of a tertiary amine such as, for example, N,N-dimethylaniline, triethylamine, or the like. The formation of imino ether is complete in 0.5 to 3 hours at a reaction temperature of −60° C. to 0° C. by adding dropwise an alcohol (IV) into the reaction mixture or by adding dropwise a solution of imino chloride into an alcohol (IV), and the imino ether is formed almost quantitatively.

Upon addition of ice water with stirring to the thus obtained solution of imino ether, there occur simultaneously both hydrolysis of the imino ether and gradual removal of the carboxyl-protecting group to regenerate a carboxylic acid. Then the reaction mixture is neutralized with a basic substance such as, for example, triethylamine, aqueous ammonia, ammonium carbonate, an alkali metal hydrogencarbonate, an alkali metal carbonate, an alkali metal hydroxide, or the like, to a pH of about 4.0, i.e. the isoelectric point of 6-APA (II), the deposit crystals. The crystals are collected by filtration, and washed with water, aqueous methanol, aqueous ethanol, aqueous acetone, or the like, to obtain crude crystals of 6-APA. Under the optimum conditions, plate crystals of 96.5–98% purity may be obtained in a yield of about 90%, which may be used without further purification as the starting material for synthetic penicillins.

As mentioned above in detail, the present invention provides a process for producing 6-aminopenicillanic acid (II) by chemical means from 6-acylamidopenicillanic acids (I), which comprises blocking the carboxyl group of the latter with a novel protecting group heretofore never been tried, and conducting a series of reactions through an imino halide, then imino ether, and finally straight to 6-aminopenicillanic acid (II). Moreover, in the present process 6-aminopenicillanic acid (II) containing none of proteins may be obtained in high yields by simplified procedures from inexpensive starting materials. These advantages make the process extremely valuable for the industry.

The invention is further illustrated below in detail with reference to examples.

EXAMPLE 1

7.8 grams of a dry fine powder of technical grade benzylpenicillin-potassium (95% purity) was added to 30 ml. of alcohol-free methylene chloride containing 5.6 ml. of N,N-dimethylaniline, and the mixture was cooled to 0° C. To the stirred mixture was added dropwise a liquid mixture of 2.2 g. of phosphorus trichloride and 5 ml. of methylene chloride. After the addition, the mixture was further stirred for 20 to 30 minutes while being cooled in ice. In the meantime, almost all of the potassium salt of penicillin, which is the starting material, disappeared and different crystals of potassium chloride were deposited. To this mixture, while being cooled at a temperature below −60° C. and stirred vigorously, was added at a time 4.5 g. of potassium pentachloride which had been finely ground just before the addition, the powder adhered on the inlet wall having been washed down with a small amount of methylene chloride. Since the reaction was accompanied by moderate evolution of heat, care was taken so that the temperature might not rise above −30° C. After being stirred at −50° to −30° C. for about 2 hours, the mixture was cooled again to a temperature below −60° C. To the vigorously stirred mixture was added dropwise a mixed solution of 1 ml. of N,N-dimethylaniline and 30 ml. of n-butanol. Since heat was evolved at the beginning of the addition, the dropping rate of said solution was controlled so as to keep the temperature below −40° C. After completion of the addition, the mixture was stirred at −50° to −40° C. for about 2 hours, and then the cooling bath was removed while stirring was continued until the temperature of the reaction mixture rose to −15° to −10° C. Then the mixture was poured into 30 ml. of ice water. The reactor was washed with 10 ml. of ice-cooled 60%-methanol, and the washings were added to said reaction mixture in ice water. The combined mixture was vigorously stirred while being cooled in ice, whereupon the pH of the mixture began to decrease. After about 10 to 20 minutes, ammonium carbonate was added thereto in small portions to raise the pH gradually. At a pH of about 3, crystals began to deposit. The pH was finally adjusted to 4.0 and the solution was kept overnight in an ice cabinet. The crystals were collected, washed several times with cold 60%-methanol, then with acetone, and dried. There was obtained 3.8 g. (88% yield) of plate crystals melting at 190–191° C. (decomp.). The thin layer chromatogram and infrared absorption spectrum of the product showed agreement with those of the standard specimen. The purity was found to be 97.3% by the hydroxylamine method and alkali titration.

Phenoxymethylpenicillin-potassium (98% purity) was used in place of benzylpenicillin-potassium to obtain the same results.

EXAMPLE 2

The procedure of Example 1 was repeated under the same reaction conditions, except that 0.7 to 0.9 mol of each halogenated phosphorus compound shown in the following table was used per mol of the penicillin-potassium instead of phosphorus trichloride. 6-APA (II) was obtained in yields of 74 to 89% as shown in the table.

| Compound | Mol ratio | Yield, percent |
| --- | --- | --- |
| $CH_3OPCl_2$ | 0.8 | 85 |
| $C_2H_5OPCl_2$ | 0.8 | 86 |
| $n\text{-}C_3H_7OPCl_2$ | 0.8 | 85 |
| $n\text{-}C_4H_9OPCl_2$ | 0.8 | 89 |
| $ClCH_2CH_2OPCl$ | 0.9 | 81 |
| $ClCH_2CH(Cl)CH_2OPCl_2$ | 0.7 | 74 |
| $ClCH_2CH_2CH_2OPCl_2$ | 0.8 | 75 |
| $CH_2CH(Cl)CH_2OPCl_2$ | 0.8 | 74 |
| $CH_3OCH_2CH_2OPCl_2$ | 0.8 | 86 |
| $C_2H_5OCH_2CH_2OPCl_2$ | 0.8 | 86 |
| $C_6H_5PCl_2$ | 0.7 | 84 |

Phenoxymethylpenicillin-potassium was used in place of benzylpenicillin-potassium to obtain comparable results.

EXAMPLE 3

The procedure of Example 1 was repeated under the same reaction conditions, except that 1.3 to 1.5 mol of each halogenated phosphorus compound shown in the following table was used per mol of the penicillin-potassium in place of phosphorus trichloride. 6-APA (II) was obtained in yields of 76 to 90% as shown in the table.

| Compound | Mol ratio | Yield, percent |
| --- | --- | --- |
| $(CH_3O)_2PCl$ | 1.3 | 76 |
| $\begin{array}{c}CH_2O\\ \phantom{CH_2O}\diagdown\\ \phantom{CH_2O}\phantom{O}PCl\\ \phantom{CH_2O}\diagup\\ CH_2O\end{array}$ | 1.5 | 90 |

EXAMPLE 4

A cold ethylene chloride solution containing 2 g. of phosgene was added to a mixture comprising 8.0 g. of technical grade benzylpenicillin-potassium, 5 ml. of anhydrous 2,6-lutidine and 30 ml. of ethylene chloride, which had been cooled in ice. After being stirred for about one hour in an ice bath, the reaction mixture was cooled to —60° C., and 4.5 g. of a fine powder of phosphorus pentachloride was added thereto. After being stirred at —50° to —30° C. for 2 hours, the mixture was again cooled to —60° C., and thereto was rapidly added dropwise a cold solution of 0.5 ml. of triethylamine in 30 ml. of isopropanol while maintaining the temperature below —40° C. The mixture was stirred at —50° to —40° C. for 2 to 3 hours, and then the cooling bath was removed. When the temperature reached —10° C., the mixture was poured into 30 ml. of ice water with stirring. After 20 minutes, pH of the mixture was gradually adjusted to 4.0 with ammonium carbonate, and then the mixture was kept overnight in an ice cabinet. The crystals deposited were collected in an ordinary way, washed, and dried to obtain 3.3 g. of the product (77% yield).

EXAMPLE 5

In place of phosphorus trichloride in Example 1, 0.7 mol of phosphorus pentachloride per mol of the penicillin-potassium was used. The reaction was conducted at a temperature below —10° C., and immediately after the disappearance by dissolution of a greater part of the crystals of penicillin-potassium the mixture was cooled to a temperature below —60° C. After addition of equivalent mol of phosphorus pentachloride, the procedure of Example 1 was followed, except that the hydrolysis was carried out at a pH of lower than 1 for about 30 minutes. The yield was 67%.

EXAMPLE 6

In place of phosphorus trichloride in Example 1, 1.8 mol of phosphorus oxychloride per 2 mol of penicillin-potassium was used. The reaction was conducted with stirring at a temperature of 0° to 20° C., and immediately after the disappearance by dissolution of a greater part of the penicillin-potassium the mixture was cooled to —60° C. After addition of phosphorus pentachloride, the procedure of Example 1 was followed, except that the hydrolysis was carried out at a pH of lower than 1 for about 30 minutes. The yield was 63%.

EXAMPLE 7

The procedure of Example 6 was repeated under the same conditions except that compounds of phosphorus(V) shown in the following table were used in place of phosphorus trichloride in Example 11. The yields were 42 to 83% as shown in the table.

| Compound | Mol ratio | Yield, percent |
| --- | --- | --- |
| $CH_3CH(Cl)CH_2OPOCl_2$ | 0.8 | 47 |
| $ClCH_2CH_2OPOCl_2$ | 0.8 | 46 |
| $ClCH_2CH(Cl)CH_2OPOCl_2$ | 1.0 | 42 |
| $C_2H_5OPOCl_2$ | 1.0 | 71 |
| $C_6H_5OPOCl_2$ | 1.0 | 73 |
| $C_2H_5OCH_2CH_2OPOCl_2$ | 1.0 | 64 |
| $n-C_4H_9OPOCl_2$ | 1.2 | 67 |
| $C_6H_5POCl_2$ | 1.2 | 83 |

EXAMPLE 8

The procedure of Example 1 was repeated, except that $n-C_4H_9OSiCl_3$ was used in place of phosphorus trichloride in Example 1 and the hydrolysis was carried out at a pH of lower than 1 for about 30 minutes. The yield was 72%.

Comparable results were obtained when $ClCH_2CH_2O-SiCl_3$ was used instead of phosphorus trichloride.

EXAMPLE 9

In place of the compounds of phosphorus(III) in Example 2, 0.7 to 0.9 mol of a silicon dichloride compound per mol of the penicillin-potassium was used, and the reaction and other treatments were carried out in a manner similar to that in Example 1. 6-APA was obtained in yields of 72 to 86% as shown in the following table.

| Compound | Mol ratio | Yield, percent |
| --- | --- | --- |
| $(CH_3O)_2SiCl_2$ | 0.8 | 81 |
| 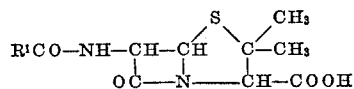 | 0.8 | 86 |
| $(ClCH_2CH_2O)_2SiCl_2$ | 0.7 | 72 |
| $(n-C_4H_9O)_2SiCl_2$ | 0.8 | 84 |
| $(CH_3OCH_2CH_2O)_2SiCl_2$ | 0.9 | 85 |

EXAMPLE 10

The procedure of Example 1 was repeated under the same conditions, except that 1.5 mol of each silicon monochloride compound shown in the following table was used per mol of the penicillin-potassium in place of phosphorus trichloride in Example 1. 6-APA was obtained in yields of 74 to 86% as shown in the table.

| Compound | Yield, percent |
| --- | --- |
| $(CH_3O)_3SiCl$ | 84 |
| $(ClCH_2CH_2O)_3SiCl$ | 74 |
| 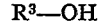 | 85 |
| (similar structure) | 86 |

EXAMPLE 11

The procedure of Example 1 was repeated, except that 0.7 mol of silicon tetrachloride per mol of the penicillin-potassium was used in place of phosphorus trichloride and the hydrolysis was carried out at a pH of less than 1 for about 30 minutes. The yield was 47%.

What is claimed is:

1. In a process for producing 6-aminopenicillanic acid, wherein an acylamino acid of the formula:

$$R^1CO-NH-CH-CH \overset{S}{\underset{}{\diagdown}} \overset{CH_3}{\underset{}{\diagup}} C-CH_3$$
$$\quad\quad\quad\quad\quad OC-N-CH-COOH$$

wherein $R^1$—CO— is an acyl group of an organic carboxylic acid having 1 to 17 carbon atoms, or a tertiary amine, alkali metal or alkaline earth metal salt thereof, with a halogenated compound in the presence of an acid-binding reagent selected from the group consisting of N,N'-dimethylaniline, 2,6-lutidine, pyridine, quinoline, and triethylamine, to protect the carboxyl group of said acylamino acid; the resulting acylamino acid having its carboxyl group protected is converted into a corresponding imino halide by reaction with an imino halide-forming reagent under anhydrous conditions at a temperature from as low as —40° C. to room temperature, said reagent being selected from the group consisting of $PCl_5$, $PBr_5$, $PBr_3$, $POCl_3$, and $COCl_2$; the imino halide is reacted at a temperature not higher than —10° C. with an alcohol of the formula, $$R^3-OH$$

wherein $R^3$ is alkyl group of 1 to 12 carbon atoms, aralkyl group having 1 to 7 aryl carbon atoms and 6 aryl carbon atoms, cyclohexyl, hydroxyoxyalkyl of 2 to 12 carbon atoms, alkoxyalkyl of 3 to 13 carbon atoms, monocyclic aryloxyalkyl having 2 to 7 alkyl carbon atoms and 6 aryl carbon atoms, monocyclic aralkoxyalkyl having 3 to 7 alkyl carbon atoms and 6 aryl carbon atoms or hydroxyalkoxy alkyl of 4 to 7 carbon atoms, to form a corresponding imino ether; and the imino ether is reacted under acid conditions with water to form 6-aminopenicillanic acid of the formula,

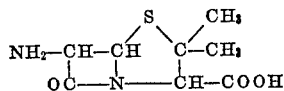

the improvement which comprises reacting said acylamino acid with said halogenated compound to protect the carboxyl group of said acetylamino acid by forming a mixed acid anhydride grouping, said halogenated compound having the formula:

$$R^2-X$$

wherein X is halogen and $R^2$ is selected from the group consisting of

wherein each of R' and R", which may be the same or different is halogen; halogen-substituted or unsubstituted alkyl, alkoxy, or alkylthio, each having 1 to 7 carbon atoms; phenyl, phenoxy, or alkyl substituted phenyl or phenoxy, each having 1 to 4 alkyl carbon atoms; and M is phosphorus;

wherein each of R', R" and R'", which may be the same or different, is halogen; halogen-substituted or unsubstituted alkyl, alkoxy, or alkylthio, each having 1 to 7 carbon atoms; phenyl, phenoxy or alkyl substituted phenyl or phenoxy, each having 1 to 4 alkyl carbon atoms; and R' and R" may jointly form a ring, and M is phosphorus;

wherein R' is halogen, halogen-substituted or unsubstituted alkyl, alkoxy, or alkylthio, each having 1 to 7 carbon atoms; phenyl, phenoxy or alkyl substituted phenyl or phenoxy, each having 1 to 4 alkyl carbon atoms; each of R", R''' and R'''' is halogen, and R" and R''' may jointly form a ring, or =O or =S; and M is phosphorus; and phosgene.

2. A process according to claim 1, wherein the acylamino acid is selected from the group consisting of penicillin G and penicillin V.

3. A process according to claim 1, wherein the halogenated compound for protecting a carboxyl group of acylamino acid is selected from the group consisting of $C_6H_5PCl_2$, $C_6H_5OPCl_2$, n-$C_4H_9OPCl_2$, $CH_3OPCl_2$, $C_2H_5OPCl_2$, $CH_3OCH_2CH_2OPCl_2$, $ClCH_2CH_2OPCl_2$,

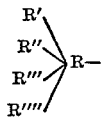

and $PCl_3$, $POCl_3$, $PCl_5$, $C_6H_5POCl_2$, $C_6H_5OPOCl_2$, and $C_2H_5OPOCl_2$.

4. A process according to claim 1, wherein the halogenated compound for protecting the carboxyl group of acylamino acid is selected from the group consisting of $R'OPCl_2$, $PCl_3$, $POCl_3$ and $PCl_5$.

5. A process according to claim 1, wherein the imino halide-forming reagent is $PCl_5$.

6. A process according to claim 4, wherein the halogenated compound for protecting the carboxyl group of acylamino acid is a compound of the formula, $R'OPCl_2$ (wherein R' is a substituted or unsubstituted lower alkyl group) or $PCl_3$.

7. A process according to claim 6, wherein the halogenated compound for protecting the carboxyl group is $PCl_3$.

8. A process according to claim 1, wherein the acylamino acid having its carboxyl group protected is reacted with the imino halide-forming reagent at a temperature of about $-10°$ to $-40°$ C.

9. A process according to claim 1, wherein the imino halide is reacted with an alcohol at a temperature of about $-10°$ to $-50°$ C.

10. A process according to claim 9, wherein the alcohol is selected from the group consisting of methanol, n-propanol, and n-butanol.

11. A process according to claim 1, wherein the acylamino acid having its carboxyl group protected is reacted with the imino halide-forming reagent at a temperature of about $-10°$ to $-40°$ C., and the resulting imino halide is reacted with an alcohol selected from the group consisting of methanol and n-butanol at a temperature of about $-10°$ to $-50°$ C.

12. A process for producing 6-aminopenicillanic acid which comprises (A) reacting penicillin G-potassium or penicillin V-potassium with phosphorous trichloride in a solvent selected from the group consisting of methylene chloride, chloroform and ethylene chloride, in the presence of N,N-dimethylaniline to protect the carboxyl group of the said penicillin by forming a mixed acid anhydride grouping, (B) reacting the resulting acylamino acid having its carboxyl group protected with phosphorous pentachloride at $-10°$ to $-40°$ C. to form the imino halide thereof, (C) reacting the imino halide with methanol or n-butanol, containing a small amount of N,N-dimethylaniline, at $-10°$ to $-50°$ C. to form the imino ether and then (D) hydrolyzing the imino ether under acidic condition with water to obtain 6-aminopenicillanic acid.

13. A process according to claim 1, wherein the salt of acylamino acid is an alkali metal salt of benzylpenicillin.

14. A process according to claim 13, wherein the salt of acylamino acid is benzylpenicillin-potassium.

15. A process according to claim 1, wherein during hydrolysis the reaction mixture is neutralized with a basic substance selected from the group consisting of triethylamine, ammonia, ammonium carbonate, an alkali metal hydrogen carbonate, an alkali metal carbonate, and an alkali metal hydroxide.

References Cited
UNITED STATES PATENTS

| | | |
|---|---|---|
| 3,499,909 | 3/1970 | Weissenburger et al. 260—243 C |
| 3,549,628 | 12/1970 | Chauvette 260—243 C |
| 3,575,970 | 4/1971 | Weissenberger et al. 260—243 C |

NICHOLAS S. RIZZO, Primary Examiner

U.S. Cl. X.R.

260—239.1, 243 C; 424—271, 246